(12) United States Patent
Bonassa

(10) Patent No.: US 7,798,016 B2
(45) Date of Patent: Sep. 21, 2010

(54) FLOW SENSOR WITH DOUBLE OBSTRUCTION

(75) Inventor: Jorge Bonassa, São Paulo (BR)

(73) Assignee: Intermed Equipamento Medico Hospitalar LTDA., Sao Paulo (BR)

( * ) Notice: Subject to any disclaimer, the term of this patent is extended or adjusted under 35 U.S.C. 154(b) by 108 days.

(21) Appl. No.: 12/205,063

(22) Filed: Sep. 5, 2008

(65) Prior Publication Data

US 2009/0064794 A1 Mar. 12, 2009

(30) Foreign Application Priority Data

Sep. 6, 2007 (BR) .................................. 0703836

(51) Int. Cl.
*G01F 1/58* (2006.01)
(52) U.S. Cl. ................................................. 73/861.61
(58) Field of Classification Search .............. 73/861.61, 73/861.52, 861.53; 137/312
See application file for complete search history.

(56) References Cited

U.S. PATENT DOCUMENTS

| 4,989,456 | A | * | 2/1991 | Stupecky | 73/863.53 |
| 5,925,831 | A | * | 7/1999 | Storsved | 73/861.52 |
| 5,970,801 | A | * | 10/1999 | Ciobanu et al. | 73/861.52 |
| 6,722,211 | B1 | * | 4/2004 | Ciobanu et al. | 73/861.52 |
| 7,021,798 | B2 | * | 4/2006 | Tsimerman et al. | 362/362 |
| 7,270,143 | B2 | * | 9/2007 | Kohlmann et al. | 137/312 |
| 7,337,678 | B2 | * | 3/2008 | Thakre et al. | 73/861.52 |
| 7,654,154 | B2 | * | 2/2010 | Garnett et al. | 73/861.52 |

* cited by examiner

*Primary Examiner*—Jewel Thompson
(74) *Attorney, Agent, or Firm*—Fulbright & Jaworski LLP

(57) ABSTRACT

The present invention refers to a flow sensor with double obstruction disclosing a simple and innovative structure, able to promote a series of advantages and new technical effects from the combination of fixed and variable obstruction elements. More particularly, the present invention comprises a front main body (12) and a main body (40) fitted to each other so to press two obstruction elements, the first one being fixed (30) and the second being variable (50), so to increase sensitivity and reduce the annoying noise, being especially useful to monitor patients for long periods.

15 Claims, 3 Drawing Sheets

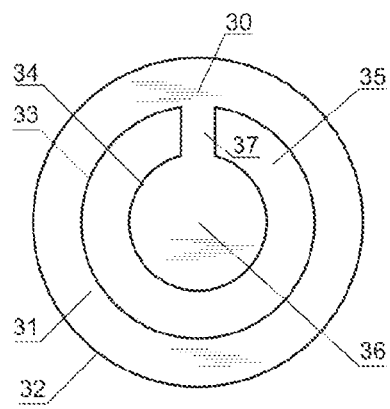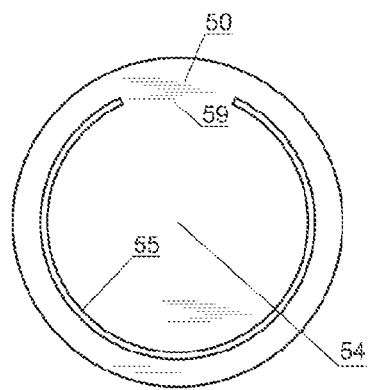
*Fig. 3*    *Fig. 4*
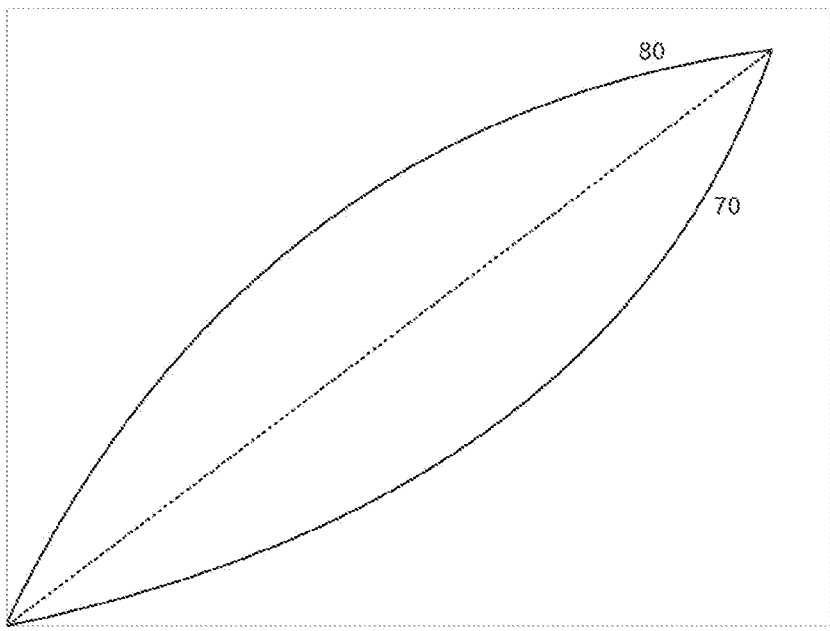
*Fig. 5*

FLOW SENSOR WITH DOUBLE OBSTRUCTION

FIELD OF THE INVENTION

The present invention relates to a flow sensor with double obstruction, and also relates to a sensor comprising a body defining a flow passage, a first fixed obstruction mounted crosswise to the flow passage, a second obstruction, also mounted crosswise to the flow passage and downstream from the first fixed obstruction and two ports for pressure measurement located upstream from the fixed obstruction and downstream from the variable obstruction.

The present invention also relates to a sensor with double obstruction combining fixed and variable obstructions in one single body, to obtain better sensitivity and less noise, especially for the monitoring of patients for long periods.

The sensor object of the present invention relates to the field of flow sensors of the type generating pressure drop that is proportional to the flow passing through the sensor, due to an obstruction interposed at the flow passage.

BACKGROUND OF THE INVENTION

These types of sensors are usually designated as pneumotachographs, since they transform a flow signal into a pressure signal. Usually, pressure drop by obstruction of the sensor is converted into an electric signal by means of a differential pressure transducer, and may be integrated into a volume calculation, particularly to measure the breathing function in patients.

The ratio of the flow passing through the sensor to the respective pressure drop through the obstruction defines the sensitivity or gain of the sensor. Constant gain or linear ratio between the flow and pressure drop represents an ideal response, facilitating the calibration process and minimizing the need for additional calculations to obtain the correct flow.

The use of said pneumotachograph type sensors is one of the most widely spread for medical application, especially in anesthesia equipment and lung ventilators. Pneumotachographs present various advantages over other types of flow sensors, e.g.: the part applied to the patient is free from electric connections, has low cost, is compatible with cleaning and sterilization processes, immune to electromagnetic interference and low-sized.

The use in patients requires some attributes such as precision at low and high flows, relative immunity to patient secretions and enough resistance to support cleaning and sterilization processes.

These requirements have been met, to some extent, by two types of flow sensors from the class of pneumotachographs, known as fixed area sensors and variable area sensors, or even fixed orifice sensors or variable orifice sensors.

Fixed area sensors are disclosed by the U.S. Pat. Nos. 4,047,521; 5,088,332; 5,379,650; and 6,312,389.

U.S. Pat. No. 4,047,521 discloses a flow sensor comprising a tube inside which two cylindrical bodies, aligned and in opposite senses, are radially projected, constituting an obstruction element. This system aims to be relatively simple and easy for manufacture in comparison with Fleisch type pneumotachographs.

Fleisch type pneumotachographs have been extensively used through the years, mainly in lung tests and research applications, due to their linear response, i.e. the pressure drop by means of the obstruction of sensor is proportional to the flow, dismissing the need for corrections by software. However, these sensors make use of a screen as an obstruction element, liable to the accumulation of patient secretions, making this kind of sensor inadequate to continuously monitor the patient. Furthermore, they are relatively large and heavy. Despite attempting to solve the problems of the Fleisch pneumotachograph, the sensor as disclosed by the U.S. Pat. No. 4,047,521 shows non-linear response, since the pressure drop is a square function of flow, thus resulting in low sensitivity at low flows and high resistance at higher flows.

U.S. Pat. No. 5,088,332 discloses another alternative, wherein the fixed obstruction is constituted by wings laterally located inside the flow passage tube, aimed to minimize the accumulation of liquids and secretions in comparison with other sensors, such as Fleisch type. Also in this configuration, the sensitivity to low flows constitutes the main problem. Furthermore, geometry as proposed does not avoid the accumulation of secretions along the obstruction. Wing intersection with the internal wall of the tube, where flow passes, creates a lengthwise region with low speed and high friction, favoring the accumulation of secretions during continued use.

U.S. Pat. No. 5,379,650 discloses a sensor with similar objects to patents as previously disclosed. That patent discloses a sensor which obstruction is located lengthwise and extends diametrically between the walls of the tube, being pressure measurement points located axially at the ends of the obstruction.

The obstruction intersection with tube walls results in lengthwise extension, which, as in the case of the patent as previously mentioned, facilitates adherence and secretion accumulation. That sensor also presents quadratic relationship between pressure and flow, thus resulting in low sensitivity under low flow.

As previously stated, another alternative for obstruction sensors are orifice or variable area sensors, as disclosed by the U.S. Pat. Nos. 4,006,634, 4,083,245, 4,688,433, 4,993,269 and 5,038,621.

The advantages of variable area sensors are related to the level of sensitivity in low flow measurements and the reduction of risks of secretion accumulation.

U.S. Pat. No. 4,006,634 discloses a sensor wherein the obstruction comprises a set of flexible radial flaps which are crosswise located and flexed according to the passage of flow, thus proportionally increasing the area of passage. According to said patent, the appropriate sizing of that arrangement may result in linear response. This alternative requires extreme care for handling, cleaning and sterilization, due to the fragile flexible flaps, usually constructed from very thin metal plates. The presence of secretion and condensate accumulation may affect the response by this model of sensor.

Another problem in the sensor of the state of the art relates to vibration, especially due to the presence of contaminants and higher flows.

U.S. Pat. No. 4,083,245 discloses a sensor with simpler embodiment than multiple flaps, just comprising one elastic flap, to increase the passage of one orifice through flow passage. However, the precise alignment of the flap over the orifice is essential to keep the pressure under low flows, a condition which is hard to maintain in the presence of secretions or condensation.

U.S. Pat. No. 4,688,433 discloses a sensor wherein the obstruction is constituted by a rigid member radially located to the sense of flow, having a second flexible member assembled upstream. For low flows, the flexible member moves freely and the sensor behaves as having variable area. For higher flows, the excursion (movement) of the flexible member is limited by the rigid member and the sensor now shows the characteristic of a fixed area sensor, resulting in a sigma curve. In this case, there is a transition point characterized by limiting the movement of the flexible member. Furthermore, as in previous cases, the position of the flexible member in the region of nearly zero flow is critical, depending on the rest position of the flexible element, susceptible to contamination and misalignment due to continued use.

U.S. Pat. No. 4,993,269 discloses a sensor wherein the obstruction comprises a flexible element away from the internal walls of the sensor tube, with the purpose to avoid the accumulation of secretions. In this case, for higher flows, the pressure drops more than proportionally, thus reducing sensor sensitivity in higher flows, besides the susceptibility to vibration due to the free flexible element.

U.S. Pat. No. 5,038,621 discloses a variable area sensor wherein the obstruction comprises an elastic membrane including three flaps cut on the membrane itself, opening with the passage of flow. The obstruction as disclosed by that patent aims to obtain higher sensitivity under low flows. However, the opening of side flaps with no anchoring reduces the natural frequency of the system and provides the occurrence of vibrations at higher flows or under continued flow conditions.

As explained, the need for improvements in sensors of the state of the art concerning sensitivity, stability, immunity to secretions and resistance to support the required cleaning and sterilization processes is evident.

BRIEF SUMMARY OF THE INVENTION

An object of the present invention is therefore to provide a sensor aiming to improve the sensors of the state of the art, more specifically indicated for medical applications, and mainly to monitor the respiratory function in lung ventilators and anesthesia devices. In one embodiment, the sensor of the present invention comprises a body defining a flow passage, a first fixed obstruction mounted crosswise to the flow passage, a second variable obstruction, also mounted crosswise to the flow passage and downstream from the first fixed obstruction and two ports to measure pressures located upstream from the fixed obstruction and downstream from the variable obstruction.

More particularly, an object of the present invention is to provide the combination of both fixed and variable obstructions in one single body, resulting in a flow sensor with double obstruction, with the result of improving sensitivity and stability aspects, especially in cases of continuous monitoring.

In a preferential configuration, the fixed obstruction comprises a rigid plate with a semi-ring orifice, defining a centered disc which is fixed by the top through a section which is aligned to pressure ports, assembled crosswise at the passage of flow. The variable obstruction comprises a flexible thin plate, with a semi-ring cut defining a centered disc which is also fixed by the top by means of a section aligned to pressure ports. Both plates are mounted side by side, the flexible one downstream, wherein the diameter of the flexible disc is longer than the external diameter of the orifice at the rigid plate, so to keep the flow path fully closed in the absence of downstream flow, thus avoiding the occurrence of reverse flow and allowing free movement of the flexible disc in downstream direction.

The characteristic curve resulting from the sensor with double obstruction object of the present invention is the sum of the quadratic curve of the fixed area sensor and the inverted parabolic curve of the variable area sensor, wherein, by means of appropriate dimensioning of both obstructions, it is possible to obtain linear relationship.

In this preferential configuration, the flow sensor is unidirectional, to be used e.g. in the exhalation limb of the respiratory circuit to measure the exhaled flow, incorporating the function of anti-re-inhalation unidirectional valve.

BRIEF DESCRIPTION OF THE SEVERAL VIEWS OF THE DRAWING

Therefore, to allow better understanding of the flow sensor with double obstruction of the present invention, we will disclose in detail the attached figures representing:

FIG. 3—front view of a detail of a fixed obstruction element;

FIG. 4—front view of a variable obstruction element;

FIG. 5—graph showing the characteristic curve of pressure drop as a function of the flow to the fixed area sensor and to the variable area sensor of the state of the art;

DETAILED DESCRIPTION OF THE INVENTION

Figure 1:
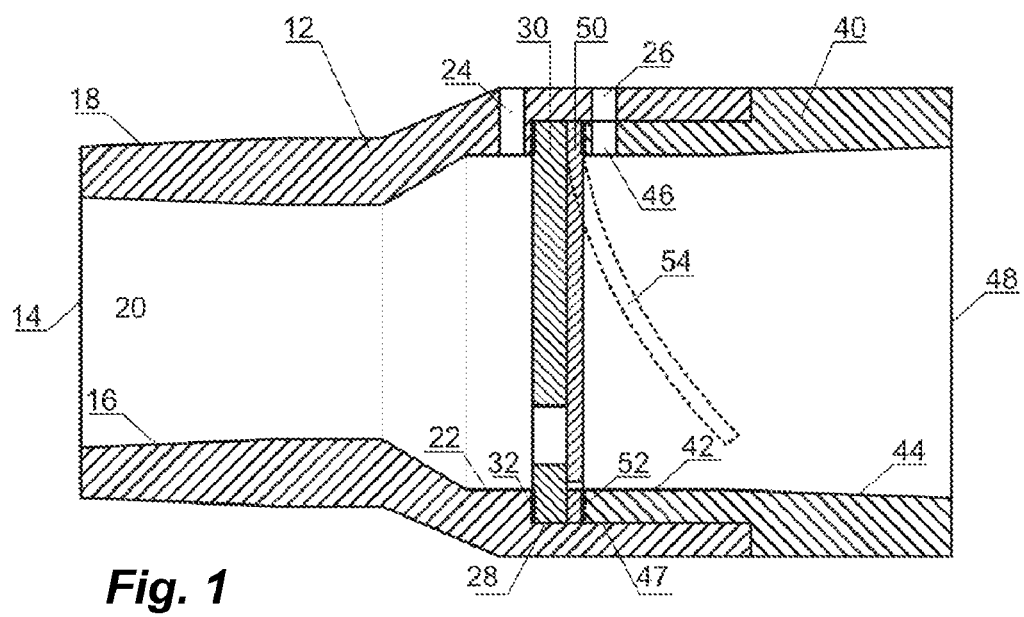
FIG. 1—longitudinal sectional view of the flow sensor with double obstruction of an embodiment of the present invention.

Referring to FIG. 1, the double obstruction sensor of the present invention, in a preferential embodiment, comprises a front part 12 of a main body having an inlet port 14 with internal diameter 16, thus defining the initial portion of the flow tube 20 and external diameter 18 defining the outside of the body. Both diameters 16 and 18, are preferably in agreement with applicable connection standards, i.e. conic connectors with 15 mm and 22 mm diameters according to the ISO rule 5356-1, *Anesthetic and Respiratory Equipment—Conical Connectors*. The initial portion of the flow tube 20 is prolonged and widened up to the diameter 22 and subsequently with longer diameter 28, where the first fixed obstruction element 30 is assembled crosswise and subsequently the second variable obstruction element 50 downstream.

The front part 12 of the main body includes two ports for pressure measurement—the first port 24 located upstream from the fixed obstruction element 30 and the second port 26 located downstream from the variable obstruction element 50.

The rear portion 40 of the main body allows positioning and fixing both obstructions, presenting internal diameter 42 equal to the diameter 22 of the front portion 12, so to define the flow tube downstream from obstructions, extending up to the outlet port 48 with diameter 44, preferably according to the connector standard as previously mentioned, i.e. 22 mm conic connection.

Figure 2:
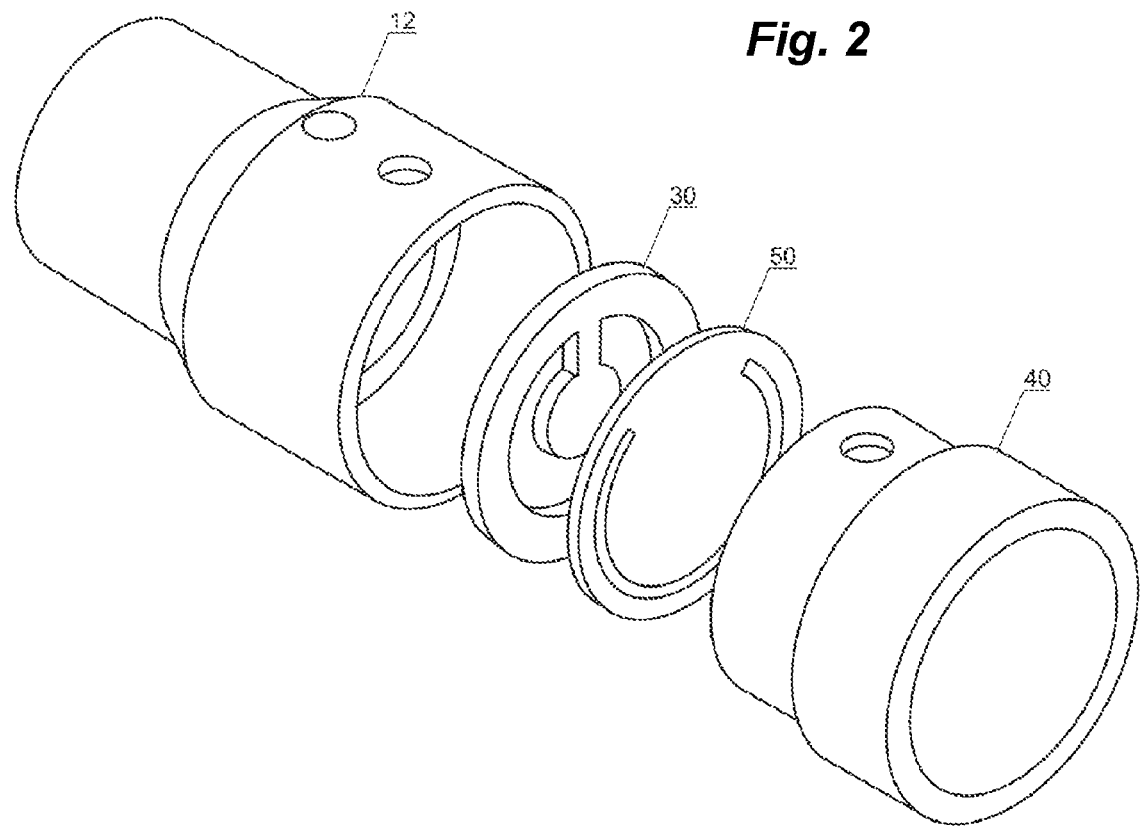
FIG. 2—exploded perspective view of the flow sensor with double obstruction of an embodiment of the present invention.

As shown by the exploded view of FIG. 2, the rear portion 40 of the body is assembled on the front portion 12, being said assembling reached by means of fitting between the regions with external diameter 47 of the rear portion 28 and with internal diameter 28 of the front portion 12, keeping both the fixed and variable obstructions pressed against the seats 32 and 52 formed by the portions of the main body.

The rear portion 40 of the body incorporates a port 46 aligned with the port 26 of the front portion 12, which purpose is to obtain measurements for pressure downstream from obstructions.

In a preferential embodiment, both front 12 and rear 40 portions of the main body are manufactured with medical grade autoclaveable plastic material such as Polysulphone, and are kept fixed by appropriate fixing means, advantageously by ultrasound welding or gluing.

Figure 6:
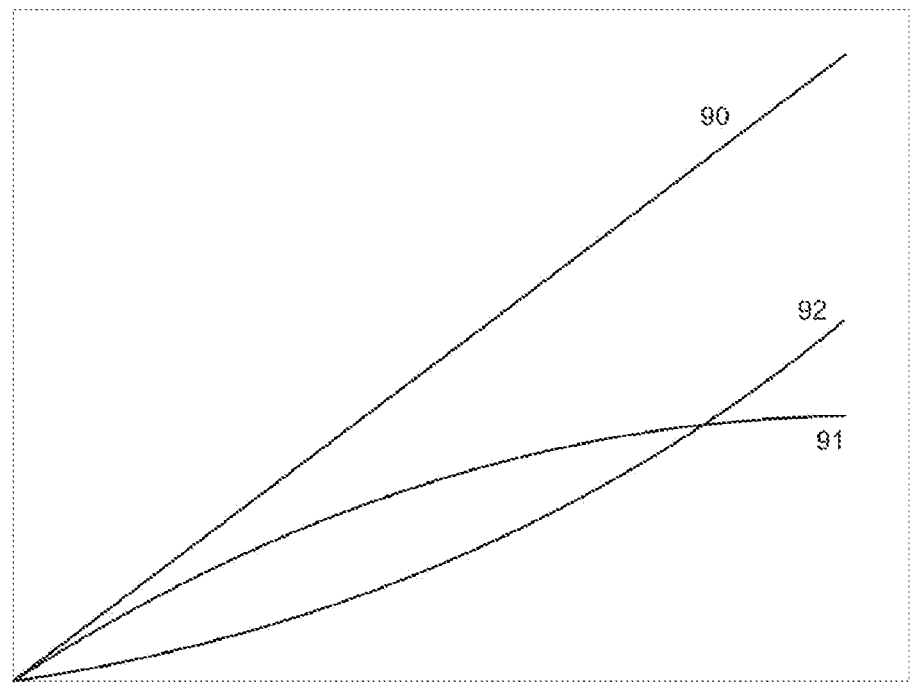
FIG. 6—graph showing the characteristic curve of pressure drop as a function of the flow for the fixed flow sensor with double obstruction object of an embodiment of the present invention, showing the components of the fixed and variable area obstructions.

The fixed obstruction 30 of this embodiment, which front view is shown by FIG. 3, comprises a thin rigid plate with a semi ring orifice 35, defining a centered disc 36 fixed by the top through section 37. Flow passage through the orifice 35 creates pressure drop presenting approximately quadratic ratio over the flow, which gain is determined by the appropriate dimensioning of diameters 33 and 34. The characteristic pressure drop curve as a function of the flow through the fixed orifice is represented by FIG. 6 as the curve 92. The diameter of the external edge 33 of the orifice is preferably shorter than the internal diameter 42 of the flow tube, so to provide a seat to accommodate the flexible disc 54 of the variable obstruction 50 and also prevent interference from secretions into its movement.

The width of the section 37 fixing the rigid disc 36 should be enough to provide rigidity to the set, avoiding the disc 36 from flexing through the flow passage.

The variable obstruction 50 of this embodiment, which front view is shown by FIG. 4, comprises a thin flexible plate with a semicircular cutting defining a flexible disc 54, which is fixed on the top by the section 59.

Flow passage causes the flexible disc 54 to flex, as shown by FIG. 1 and the consequent opening of the flow passage area, causing a pressure drop curve over the flow with inverted parabolic profile over the fixed area. Under low flows, pressure drop is proportionally higher than in high flows. The ratio between pressure drop and characteristic flow from the variable area orifice is shown by the curve 91 of FIG. 6. The gain from variable obstruction is determined by appropriate material selection, according to its elastic properties and the dimensioning of the thickness of the flexible plate 50, besides the diameter 55 of the flexible disc 54 and section width 59.

In a preferential embodiment, the material of the flexible disc is a Mylar film with thickness between 0.10 and 0.15, more advantageously 0.12 mm. In another alternative embodiment, the material of the flexible disc is a medical grade silicone blanket with thickness between 0.5 and 1.5 mm, particularly 1.0 mm.

The diameter 55 of the flexible disc 54 is larger than the diameter of the external edge of the fixed orifice and smaller than the internal diameter 42 of the flow tube downstream from the obstruction. Therefore, the flow passage area is fully closed in the absence of flow. Furthermore, the existence of a space formed at the edge of the flexible disc avoids the interference from secretions on the internal wall of the flow tube while the sensor is operating.

The preferential embodiment as disclosed by the present description results in a higher sensitivity and repetitiveness under low flow conditions and also less oscillation under high flows. Furthermore, the configuration of the present invention also incorporates the function of unidirectional valve, particularly advantageous to prevent the re-inhalation of carbon dioxide during the patient's spontaneous breathing when used in the exhalation branch of the respiratory system.

Total pressure drop through both fixed and variable restrictions as assembled in series in the sense of flow is the sum of pressure drops for each obstruction. This means that the characteristic curve of the sensor with double obstruction of the present invention is the sum of the quadratic ratio of the fixed obstruction (as represented by the curve 92 in FIG. 6) to the inverted parabolic ratio of the variable obstruction (as represented by the curve 91 in FIG. 6).

By means of the appropriate dimensioning of each obstruction, it is possible to establish complementary curves, which sum results in a more linear ratio of the flow to the respective pressure drop through the sensor. The response curve for the flow sensor with double obstruction object of the present invention is represented by the curve 90 of FIG. 6.

By comparing the curves 70 and 80 of FIG. 5, respectively from the fixed and variable obstruction sensors of the state of the art, to the curves 91 and 92 of FIG. 6, from the fixed and variable obstructions of the sensor object of the present invention, we can verify that obstructions 91 and 92 are individually less restrictive than obstructions 70 and 80, as a function of relatively larger orifices. This characteristic minimizes the risk of accumulation of secretions or strange bodies as present in the flow.

The sensor may be dimensioned to present, besides the linear ratio, other ratios tending for a sensor of the fixed or variable area type, depending on the appropriate dimensioning of each obstruction. This may be advantageous in certain applications, where different sensitivity is desired for scale extremes.

Figure 7:
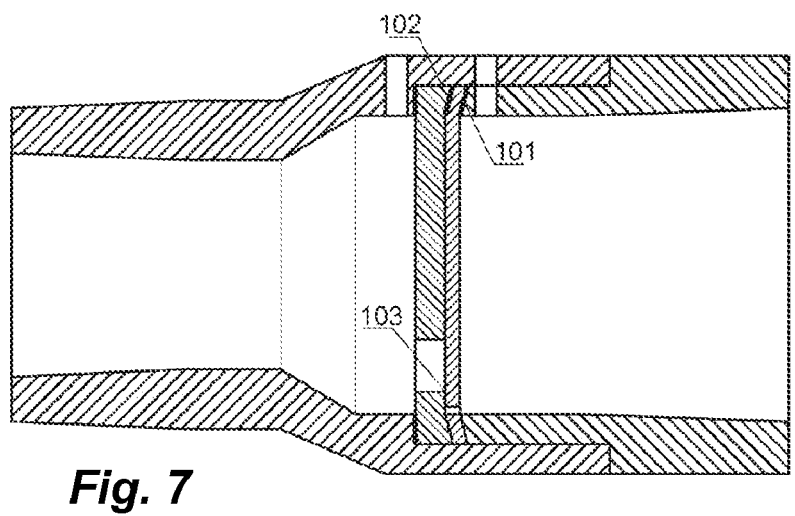
FIG. 7—longitudinal sectional view of the flow sensor with double obstruction of an embodiment of the present invention showing an alternative configuration for the seats on which the flexible element is assembled.

FIG. 7 shows an alternative configuration for the flow sensor with double obstruction. Particularly, when higher sensitivity at the beginning of the scale is desired, i.e. under low flows e.g. to improve the detection of the inhaling effort by the patient. Under this configuration, the flexible disc 50 is assembled as previously flexed so to exert closing pressure in the state of rest, thus increasing the sensitivity of the sensor for very low flows. This is obtained, as shown by the detail of FIG. 7, by instead using the plain seats as represented by the surfaces 52 and 31 as shown by FIG. 1, using conic seats 101 and 102, respectively for the fixed obstruction and the rear main body. From the assembly, the flexible disc is pressed against the edge of the fixed orifice 103, keeping a small closing pressure at the position of absence of flow, thus enabling the detection of extremely low flows.

The sensor of the present invention aims to solve the main problems as found in sensors of the state of the art. The semi ring orifice 35 of the fixed obstruction minimizes the accumulation of secretions, since the obstruction element constituted by the hard disc 36 is centered over the passage of flow, with no contact with the internal wall of the tube, except for the fixing section 37.

In addition, the present invention was designed for preferential use in the position where the pressure ports 24 and 26 and consequently the contact section 37 of the hard disc are turned to the upper side. Therefore avoiding the risks of accumulation of secretions affecting the sensor's response. Furthermore, low thickness both of the hard disc 36 and the flexible disc 54 helps to avoid the accumulation of particles.

As we can see from FIG. 1 in hatched lines, the flexible disc 54 opens in the direction of flow with no contact with the hard disc 36, except in the resting position, i.e. in the absence of flow. Therefore, the individual response from each obstruction does not affect the other one, thus avoiding pressure oscillations from the flow or inflection points in the response curve.

Another advantageous characteristic as observed during the tests of the sensor of the present invention is the reduction of pressure oscillation in comparison with conventional variable orifice sensors. The presence of the rigid disc 37 upstream from the flexible disc 54 favorably guides the flow to open the flexible disc. Under rest, the flexible disc 54 seats over the edge 31 and over the hard disc 36, thus avoiding reverse flow and incorporating its function as a unidirectional valve.

As disclosed herein, the flow sensor with double obstruction presents characteristics resulting in better performance than sensors as previously disclosed.

Despite having disclosed preferential embodiments for the object of the present invention, the experts in the art, in the light of the disclosures herein, might develop variations which are still within the scope of the present application.

On the other hand, besides the preferential application as disclosed by the present description, i.e. monitoring of respiratory flow from patients in lung ventilators and anesthesia devices, the present invention may be used in other applications, both in the presence of gases and liquids.

ALTHOUGH THE PRESENT INVENTION AND ITS ADVANTAGES HAVE BEEN DESCRIBED IN DETAIL, IT SHOULD BE UNDERSTOOD THAT VARIOUS CHANGES, SUBSTITUTIONS AND ALTERATIONS CAN BE MADE HEREIN WITHOUT DEPARTING FROM THE SPIRIT AND SCOPE OF THE INVENTION AS DEFINED BY THE APPENDED CLAIMS. MOREOVER, THE SCOPE OF THE PRESENT APPLICATION IS NOT INTENDED TO BE LIMITED TO THE PARTICULAR EMBODIMENTS OF THE PROCESS, MACHINE, MANUFACTURE, COMPOSITION OF MATTER, MEANS, METHODS AND STEPS DESCRIBED IN THE SPECIFICATION. AS ONE OF ORDINARY SKILL IN THE ART WILL READILY APPRECIATE FROM THE DISCLOSURE OF THE PRESENT INVENTION, PROCESSES, MACHINES, MANUFACTURE, COMPOSITIONS OF MATTER, MEANS, METHODS, OR STEPS, PRESENTLY EXISTING OR LATER TO BE DEVELOPED THAT PERFORM SUBSTANTIALLY THE SAME FUNCTION OR ACHIEVE SUBSTANTIALLY THE SAME RESULT AS THE CORRESPONDING EMBODIMENTS DESCRIBED HEREIN MAY BE UTILIZED ACCORDING TO THE PRESENT INVENTION. ACCORDINGLY, THE APPENDED CLAIMS ARE INTENDED TO INCLUDE WITHIN THEIR SCOPE SUCH PROCESSES, MACHINES, MANUFACTURE, COMPOSITIONS OF MATTER, MEANS, METHODS, OR STEPS.

ALL REFERENCES CITED OR OTHERWISE IDENTIFIED HEREIN ARE HEREBY INCORPORATED BY REFERENCE IN THEIR ENTIRETIES AS IF EACH HAD BEEN SPECIFICALLY INCORPORATED BY REFERENCE ABOVE. IN PARTICULAR, ALL REFERENCES ARE HEREBY INCORPORATED BY REFERENCE FOR THE SPECIFIC MATERIALS THEREIN FOR WHICH A REFERENCE HAS BEEN CITED OR RELIED UPON.

The invention claimed is:

1. A flow sensor with double obstruction, comprising a front main body accommodating crosswise a first, fixed obstruction element, followed by a second, variable obstruction element, both pressed by a rear main body by respective seats, wherein the fixed obstruction element comprises a rigid thin plate with a semi-ring orifice defining a centered disc.

2. The flow sensor with double obstruction of claim 1, wherein the centered disc is fixed at the top of the edge of the obstruction element by a connecting section.

3. The flow sensor with double obstruction of claim 1, wherein the centered disc is located at the center of and crosswise to a flow passage formed by the front main body.

4. The flow sensor with double obstruction of claim 1, wherein a diameter of the external edge of the semi-ring orifice is smaller than an internal diameter of the rear main body at an outlet port end, the outlet port end having an internal diameter equal to an internal diameter of the front main body portion most proximate to the rear main body.

5. The flow sensor with double obstruction of claim 4, wherein the external edge forms a seat for a mobile part of the second, variable obstruction element.

6. A flow sensor with double obstruction, comprising a front main body accommodating crosswise a first, fixed obstruction element, followed by a second, variable obstruction element, both pressed by a rear main body by respective seats, wherein the second, variable obstruction element comprises a flexible thin plate with a semi-ring aperture defining a flexible disc connected to the flexible thin plate.

7. The flow sensor with double obstruction of claim 6, wherein a diameter of the flexible disc is longer than the external diameter of the semi-ring orifice of the fixed obstruction element and shorter than an internal diameter of the rear main body.

8. The flow sensor with double obstruction of claim 6, wherein the flexible disc is located at the center of and crosswise to a flow passage formed by the front main body.

9. The flow sensor with double obstruction of claim 6, wherein the flexible disc comprises a Mylar film.

10. The flow sensor with double obstruction of claim 9, wherein the flexible disc has a thickness of between 0.10 and 0.15 mm.

11. The flow sensor with double obstruction of claim 10 wherein the flexible disc has a thickness of 0.12 mm.

12. The flow sensor with double obstruction of claim 6, wherein the flexible disc comprises a medical grade silicone blanket.

13. The flow sensor with double obstruction of claim 12, wherein the flexible disc has a thickness of between 0.5 and 1.5 mm.

14. The flow sensor with double obstruction of claim 13, wherein the flexible disc has a thickness of 1 mm.

15. The flow sensor with double obstruction of claim 6, wherein the flow sensor is adapted to function as a unidirectional valve.

* * * * *